US005773903A

United States Patent [19]

McCabria et al.

[11] Patent Number: 5,773,903
[45] Date of Patent: Jun. 30, 1998

[54] ROTATING RECTIFIER ASSEMBLY

[75] Inventors: Jack L. McCabria, Eudora, Kans.; Richard J. Nisonger, Belle Center, Ohio

[73] Assignee: Sundstrand Corporation, Rockford, Ill.

[21] Appl. No.: 770,919

[22] Filed: Dec. 20, 1996

[51] Int. Cl.[6] .............................. H09K 11/00; H09B 1/00; H02M 1/00
[52] U.S. Cl. ........................... 310/68 D; 310/52; 310/54; 310/60 A; 310/68 R; 363/67; 363/126; 363/144; 363/145; 357/75; 357/76
[58] Field of Search ................................ 310/68 D, 68 R, 310/52, 54, 61, 60 A; 363/145, 144, 141, 67, 126; 357/75, 76, 81, 82

[56] References Cited

U.S. PATENT DOCUMENTS

| | | | |
|---|---|---|---|
| 3,870,944 | 3/1975 | Ogawa et al. | 321/8 R |
| 3,979,659 | 9/1976 | Lynch, Jr. et al. | 321/8 R |
| 4,232,238 | 11/1980 | Saito et al. | 310/68 D |
| 4,329,603 | 5/1982 | Ballard | 310/61 |
| 4,375,612 | 3/1983 | Wirth | 318/767 |
| 4,449,177 | 5/1984 | Kozai et al. | 363/126 |
| 4,581,695 | 4/1986 | Hoppe | 363/145 |
| 4,603,344 | 7/1986 | Trommer | 357/76 |
| 4,628,219 | 12/1986 | Troscinski | 310/68 |
| 4,723,202 | 2/1988 | Kalman | 363/129 |
| 4,896,062 | 1/1990 | Pollard | 310/68 |
| 4,959,707 | 9/1990 | Pinchott | 357/76 |
| 5,001,376 | 3/1991 | Iseman | 310/68 |
| 5,003,209 | 3/1991 | Huss et al. | 310/68 |
| 5,006,741 | 4/1991 | Schott | 310/68 |
| 5,043,614 | 8/1991 | Yockey | 310/68 D |
| 5,065,484 | 11/1991 | Pinchott | 357/76 |
| 5,138,210 | 8/1992 | Crickmore et al. | 310/68 |
| 5,160,864 | 11/1992 | Saito | 310/54 |
| 5,166,564 | 11/1992 | Shahamat et al. | 310/68 |
| 5,191,248 | 3/1993 | Huss | 310/68 |
| 5,424,593 | 6/1995 | Vaghani et al. | 310/64 |

*Primary Examiner*—Thomas M. Dougherty
*Assistant Examiner*—Tran N. Nguyen
*Attorney, Agent, or Firm*—Antonelli, Terry, Stout & Kraus

[57] ABSTRACT

The invention is a rectifier assembly (10) having reduced mass and high rigidity permitting operation at high rotational speeds. The rotating rectifier includes a rotator shaft assembly (12), a first conductive diode carrier (18), a second conductive diode carrier (20), first and second electrical conductors (40 and 44) connected to the first and second diode carriers and to one end of the rectifier assembly to provide a first DC output and a second DC output and first, second and third diode groups (37, 37', 37"). Each conductive diode carrier has an inner annulus (24) including first, second and third diode receiving surfaces (26, 28 and 30) disposed at spaced apart locations on the inner annulus of the diode carrier and an outer periphery which engages an inner annulus of the rotor shaft assembly. Each diode group comprises at least two diodes (38). An electrical conductor (46, 48 and 50) is provided for connection to an electrical phase extending to the one end of the rectifier assembly and electrically connected to an anode of at least one diode of the diode group and to a cathode of at least one other diode of the diode group with a cathode of each diode of the at least one diode of each diode group being electrically connected to a diode receiving surface of the conductive diode carrier and with an anode of each diode of the at least one other diode of each diode group being electrically connected to the diode receiving surface of the second conductive diode carrier.

23 Claims, 4 Drawing Sheets

ROTATING RECTIFIER ASSEMBLY

This invention was made with Government support under prime contract P7729254 awarded by the Department of Army. The Government has certain rights in this invention.

TECHNICAL FIELD

The present invention relates to rotating rectifier assemblies and more particularly, to fullwave three phase rectifier assemblies which are used in brushless generators of alternating current.

BACKGROUND ART

Fullwave three phase rectifiers are employed in a variety of environments. Fullwave three phase rectifiers in brushless generators must have physical structures that withstand high centrifugal force generated by rotation. Furthermore, it is highly desirable that the rotating mass of the fullwave three phase rectifier be minimized and to locate the mass near the axis of rotation to lessen the structure required to support the rectifier assembly to withstand the high centrifugal force.

Brushless generators utilize typically a permanent magnet generator which, upon initiation of rotation, generates three phase alternating current which is rectified in a stator thereof and applied through a voltage regulator to excite a stator of an excitor generator. The rotor of the excitor generator generates three phase alternating current which is rectified by a fullwave three phase rectifier assembly which is mounted in the rotor shaft assembly of the main generator. The output of the three phase fullwave rectifier provides the excitation to the rotor of the main generator which outputs three phase alternating current at the stator.

In applications involving airframes, the aforementioned brushless generators operate at a synchronous speed to produce 400 Hz. alternating current which, in a typical four pole main generator, is operated at 12,000 rpms. Some brushless generators may be designed to be two pole machines which operate at 24,000 rpms. The aforementioned high synchronous speeds of 12,000 or 24,000 rpms require the three phase fullwave rectifier assembly, which is mounted in the rotor assembly of the main generator, to be structurally rigid to withstand the extremely high centrifugal force.

Diverse types of rotating rectifier assemblies for brushless generators have been developed over the years including rotating rectifier assemblies developed by the Assignee of the present application. For example, see U.S. Pat. No. 4,581,695, 5,003,209, 5,006,741, 5,138,210, 5,166,564, 5,160,864, 5,191,248 and 5,424,593. The structures employed in the fullwave three phase rectifier assemblies of these patents while being effective, are mechanically complex and/or have considerable mass located off the axis of rotation which is undesirable at the high rotational operation speeds which characterize the generation of three phase alternating current in environments involving airframes.

DISCLOSURE OF THE INVENTION

The present invention provides a rotating rectifier assembly including a three phase fullwave rectifier having first and second conductive diode carriers which have an inner trangular annulus, including first, second and third diode receiving surfaces, which are disposed at spaced apart locations on the inner annulus and an outer periphery which engages an inner non-conductive annulus of a rotor shaft assembly. First, second and third diode groups comprising at least one diode for each diode carrier respectively mounted on the first, second and third diode receiving surfaces. An electrical conductor is associated with each diode group for connection to one of the three electrical phases which extends to one end of the rectifier assembly and is electrically connected to an anode of at least one diode of one of the first, second and third diode groups and to a cathode of at least one other diode of the first, second and third diode groups. A cathode of each diode of at least one diode of the first, second and third diode groups is electrically connected to respectively the first, second and third diode receiving surfaces of the first conductive diode carrier and an anode of each diode of the at least one other diode of the first, second and third diode groups is electrically connected to the first, second and third diode receiving surfaces of the second conductive diode carrier. The outer periphery of the first and second diode carriers is comprised of three arcuate sections which engage the inner non-conductive annulus of the rotor shaft assembly and are spaced apart from each other by a portion of the periphery located and extending radially inward from the inner non-conductive annulus. Portions of the outer periphery of the first and second diode carrier do not engage the inner non-conductive annulus with each portion of the periphery facing a different one of the first, second and third diode receiving surfaces. Preferably, each portion is curved with each portion forming an arch which curves radially inward relative to an axis of rotation of the rectifier assembly from spaced apart points of engagement with the inner non-conductive annulus of the rotor shaft assembly. The arch reduces the mass of each diode carrier and further provides a rigid support forming a web between the arch and the respective first, second and third diode receiving surfaces which rigidly supports the diodes connected thereto during high rotational speeds of the rotating rectifier assembly while having reduced mass.

A plurality of electrical conductors (five) are respectively electrically connected to the first and second conductive diode carriers and to the first, second and third diode groups. A first electrical conductor is connected to the first conductive diode carrier and extends to one end of the rectifier assembly to provide a first DC output. A second electrical conductor is connected to the second conductive diode carrier and extends to the one end of the rectifier assembly to provide a second DC output. Third, fourth and fifth electrical conductors are respectively used for making connection to first, second and third electrical phases of an exciter generator and to the aforementioned first, second and third diode groups. An insulative end plug is disposed in the one end of the rectifier assembly having terminals which receive and electrically isolate the first, second, third, fourth and fifth electrical conductors from each other. The first and second conductors extend axially along the rectifier assembly and radially inward from a point of electrical connection respectively to the first and second diode carriers. The third, fourth and fifth electrical conductors extend axially along the rectifier assembly. The first, second, third, fourth and fifth conductors pass through a central aperture. The radius of this aperature is less than a smallest radius of any portion of the diodes from an axis of rotation of the rectifier assembly. First, second, third, fourth and fifth terminal connectors are connected electrically respectively to an end of each of the first, second, third, fourth and fifth electrical conductors to provide, respectively, a point of electrical connection to the first and second DC outputs and to the first, second and third electrical phases.

The rotor assembly comprises a metallic outer cylindrical sleeve having an annulus to which is attached the inner non-conductive annulus. The aforementioned central aperature is an integral part of the sleeve. This sleeve forms an oil seal up stream of the central aperature. A plurality of holes extending radially from an inside surface to an outside surface of the rotor assembly to provide a path for oil to flow radially outward from inside the rotor shaft assembly to outside the rotor shaft assembly at locations downstream of the central aperature. A source of oil is provided through a small central aperture at the antidrive-end of the rotor assembly. During rotation, the diodes become submerged in cooling oil. The radius of the central aperture downstream of the diodes is greater that the radius of the aperture at the antidrive-end of the rotor. With the centrifugal acceleration of the oil, an axial flow through the diodes is provided The present invention provides a mechanically simple lightweight rectifier assembly with sufficient structural rigidity and reduced mass for use in applications such as brushless generators which may be operated at high rotational speeds with high reliability. Furthermore, the rectifier assembly has fewer parts than many of the prior art rectifier assemblies which lessens cost and the time of assembly. This rectifier is a complete assembly which can be acceptance tested prior to installation into the rotor. Oil tight penetrations of conductors through the metal shaft are not required. Each diode is mounted so the rotational forces act to compress the diodes and their bonding joints.

BRIEF DESCRIPTION OF THE DRAWINGS

Like reference numerals identify like parts throughout the drawings.

BEST MODE FOR CARRYING OUT THE INVENTION

Figure 1:
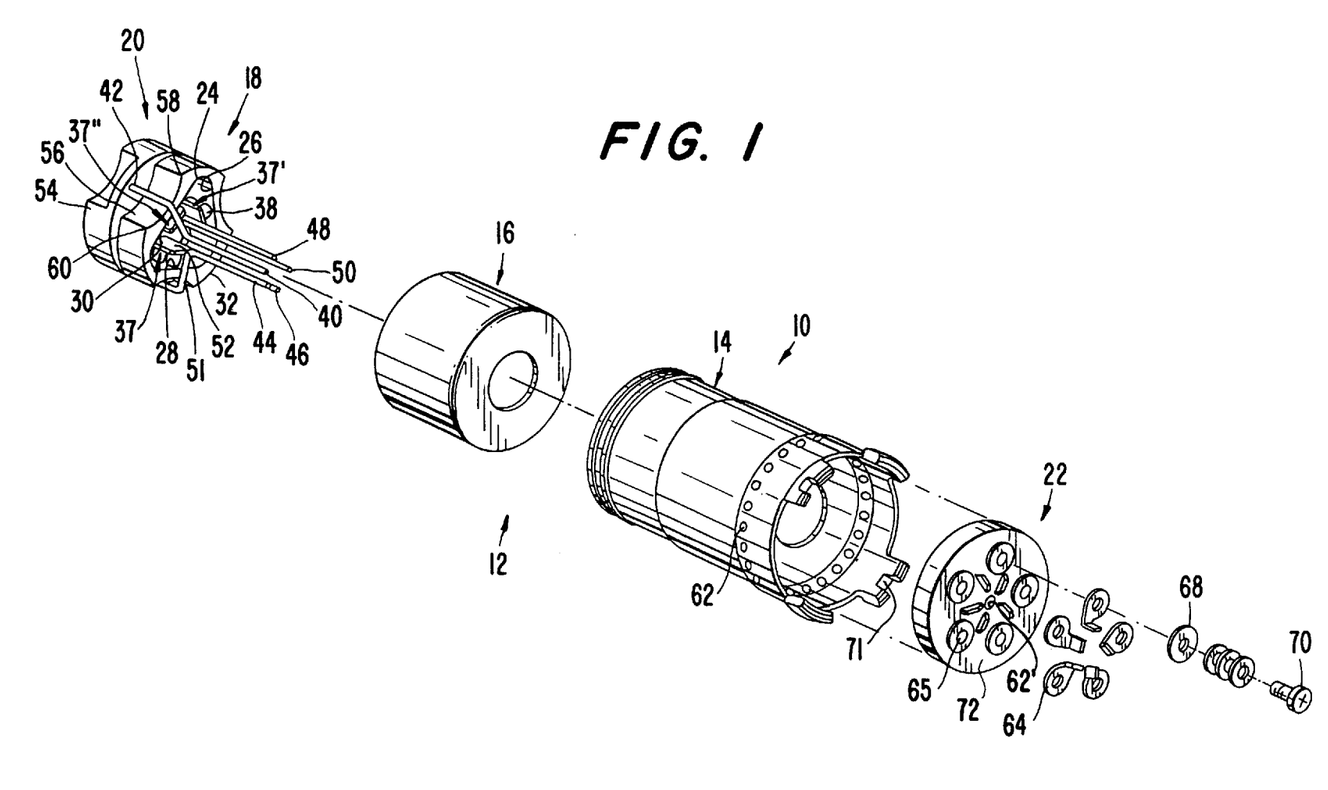
FIG. 1 is an exploded isometric view of a rotating rectifier assembly in accordance with the present invention.

FIG. 1 illustrates an exploded view of a rectifier assembly 10 in accordance with the present invention. The rectifier assembly 10 which is comprised of an outer conductive metallic cylindrical sleeve 14 and an inner non-conductive cylindrical sleeve 16 which, when mounted inside of the rotor shaft assembly, forms an inner non-conductive annulus 17 on an inside surface thereof, a first conductive diode carrier 18 which is formed of metal which is rigid, highly conductive, and has light mass, such as aluminum or alloys thereof, and a second conductive diode carrier 20 of similar construction to the first conductive diode carrier and an insulative end terminan plug 22.

The first conductive diode carrier 18 and the second diode carrier 20 have substantially the same construction, are electrically isolated from each other and each have an inner annulus 24 including a first diode receiving surface 26, a second diode receiving surface 28 and a third diode receiving surface 30, which are disposed at spaced apart locations on the inner annulus. An outer periphery 32 engages the inner cylindrical surface 17 (illustrated in FIG. 5) of the inner non-conductive sleeve 16 and may be attached with suitable adhesives or other attachment mechanisms. The inner non-conductive sleeve 16 is attached to an inner cylindrical surface 25 (illustrated in FIG. 5) of the outer cylindrical sleeve 14 with suitable adhesives or other attachment mechanisms.

Figure 6:
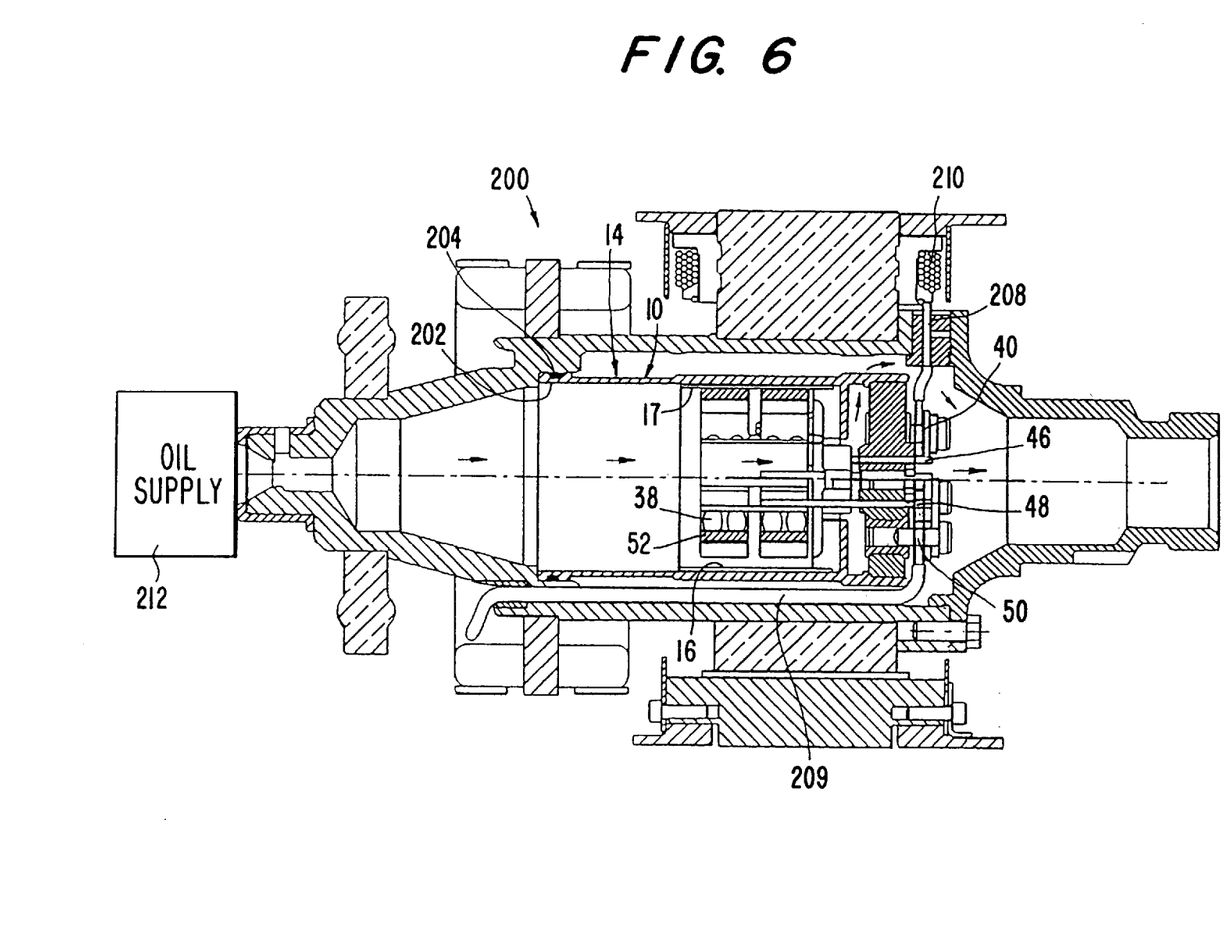
FIG. 6 illustrates a sectional view of a main generator containing the rotating rectifier assembly of the present invention.

First, second and third diode groups 37, 37' and 37", which are each comprised of at least two diodes 38, are disposed within the annulus 24 of the first and second conductive diode carriers 18 and 20 in electrical contact respectively with the first, second and third diode receiving surfaces 26, 28 and 30. A first electrical conductor 40 is electrically connected to the first conductive diode carrier 18 and extends axially along the rectifier assembly and radially inward by means of suitable bending from the point of electrical connection 42 to the first conductive diode carrier to provide a first DC output. Similarly, a second electrical conductor 42 is electrically connected to the second conductive diode carrier 20 and extends axially along the rectifier assembly and radially inward by means of suitable bending from the point of connection (not illustrated) to the second diode carrier to the one end of the rectifier assembly to provide a second DC output. The first and second DC outputs 40 and 44 are connected to the field winding of the rotor for the main generator as illustrated in FIG. 6. Third, fourth and fifth electrical conductors 46, 48 and 50, respectively, are for connection to first, second and third electrical phases of an exciter generator (not illustrated) and extend to one end of the rectifier assembly. The third, fourth and fifth electrical conductors 46, 48 and 50 are comprised of a wire section 51 which extends to a flat metallic connector 52 which is attached by braising or other methods of connection to an electrode of each of the diodes of one of the diode groups 37, 37' and 37" which is located radially closest to the axis of rotation of the rectifier assembly. Furthermore, the electrodes of the diodes 38, which are located radially farthest from the axis of rotation, are attached to the first, second and third diode receiving surfaces 26, 28 and 30, respectively, by a mechanism such as brazing to achieve a good electrical contact. As will be described in more detail below, the electrodes of the diodes are poled in such a way as to create a fullwave rectifier assembly.

The outer periphery of each of the first and second conductive diodes carriers is comprised of three arcuate sections 54 which are equally spaced around the outer periphery of the diode carriers and which engage the inner non-conductive annulus 17 of the inner non-conductive sleeve 16. The three arcuate sections 54 are equally spaced apart from each other by an intermediate portion 56 of the outer periphery extending radially inward from the inner non-conductive annulus 17 and which does not engage the inner non-conductive annulus. Each portion 56 faces a different one of the first, second and third diode receiving surfaces 26, 28 and 30, respectively. Each portion 56 forms an arch which curves radially inward toward the axis of rotation of the rectifier assembly from spaced apart points of engagement 58 and 60 with the inner non-conductive annulus 17 of the inner non-conductive sleeve 16. The arch and the opposed diode receiving surface forms an extremely strong support web which has less mass as a result of the hollowed out volume between the arch and the inner cylindrical surface 17 of the inner non-conductive sleeve 16. During high rotational speeds, such as 12,000 rpm or 24,000 rpm, the centrifugal force produced by the diode groups 37, 37' and 37" resultant from rotation is rigidly supported by the web defined between the arch and the first, second and third diode receiving surfaces 26, 28 and 30 respectively because of the inherent strength of an arch support.

The outer cylindrical sleeve 14 is provided with a plurality of apertures 62 which extend radially from an inside surface to an outside surface of the rotor assembly 10 to provide a path for oil to flow radially outward from inside the rotor shaft assembly to outside the rotor shaft assembly during rotation of the rectifier assembly. A source of pressurized oil which flows from the main generator forces oil axially along an inside cross section of the rotor shaft assembly to submerge the diodes 38 during rotation and with rotation of the rectifier assembly centrifugally accelerates the oil outward through the holes.

The insulative end plug 22 contains apertures 64 through which pass the first, second, third, fourth and fifth electrical conductors 40, 44, 46, 48 and 50. Electrical connectors 66 are attached to the ends of the electrical conductors 40, 44, 46, 48 and 50 by an attachment mechanism such as brazing to provide a mechanism for making connections to DC outputs from the rotating rectifier assembly and further to the input of electrical phases from the rotor of the exciter generator. As illustrated, a plurality of washers 68 and a threaded connector 70 are used to attach an electrical lead to each of the electrical connectors 65 which are mounted on an end face 72 of the insulative end plug 22. A notched end 71 of the outer sleeve receives set screws to hold the rectifier assembly in position, as illustrated in FIG. 6, but the notched ends and set screws are not visible in FIG. 6 because of the direction of the section plane.

Figure 2:
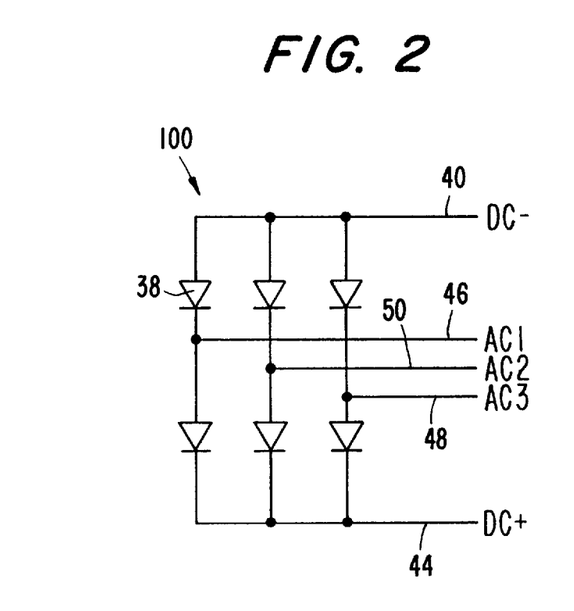
FIG. 2 is an electrical schematic of the rectifier assembly of FIG. 1.

FIG. 2 illustrates an electrical schematic 100 of the fullwave rectifier assembly.

Figure 3:
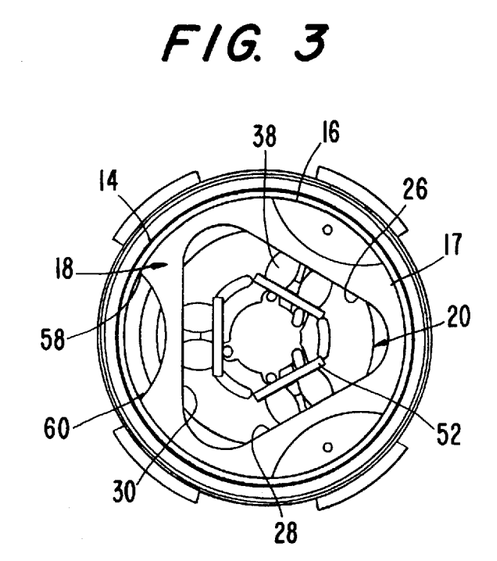
FIG. 3 is an end view of the rotating rectifier assembly of the present invention viewed from a direction from which oil is supplied for cooling of the diode groups contained therein.

FIG. 3 illustrates an end view looking from the direction of oil flow from the main generator. As is illustrated, a plurality of diodes 38 of each of the diode groups 37, 37' and 37" are connected to each of the first, second and third diode receiving surfaces 26, 28 and 30 of each of the first and second conductive diode carriers 18 and 20.

Figure 4:
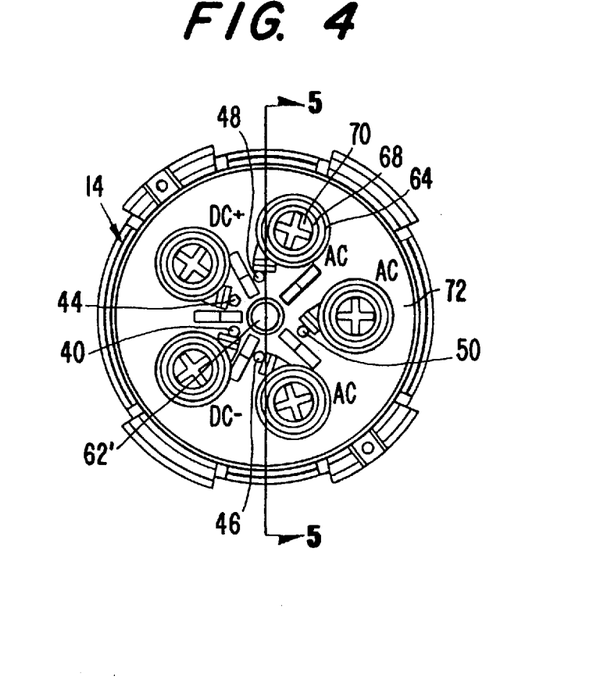
FIG. 4 is an end view of the rectifier assembly viewed from an end to which electrical connections are made.

FIG. 4 illustrates an end view of the rotating rectifier assembly as viewed from the point of electrical attachment of the conductors 40, 44, 46, 48 and 50.

Figure 5:
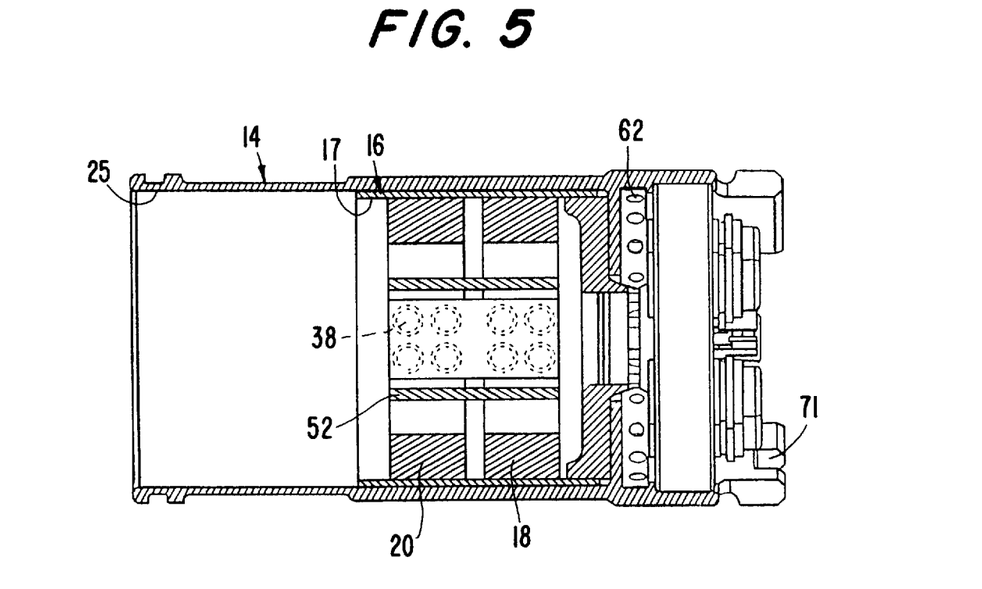
FIG. 5 is a sectional view taken along section lines 4—4.

FIG. 5 illustrates a sectional view through section plane 4–4. As illustrated, the first and second conductive diode carriers 18 and 20 are axially separated from each other to provide electrical isolation necessary to perform fullwave rectification with the diode carriers 18 and 20 respectively being the positive and negative DC outputs from the fullwave rectifier assembly 20.

FIG. 6 illustrates a main generator 200 assembly which includes the rotating rectifier assembly 10 in accordance with the present invention. As illustrated, end 202 of the rotating rectifier assembly, which is opposite the end 72 from which the electrical connections of the electrical conductors 40, 44, 46, 48 and 50 are made, has an O-ring 204 contained in a channel in an outer surface of the outer cylindrical sleeve 14 which forms a fluid-tight seal upstream of the penetrations of the lead from the exciter rotor. The DC output 40 is connected by lead 208 to the rotor windings 210 to provide excitation of the main generator in a manner well-known in the art. The lead 209 connects the exciter rotor (not illustrated) to the AC input 50. As illustrated, oil flows from an oil supply 212 located at the left of FIG. 6 to the right axially along an inner hollow cylindrical volume, as indicated by arrows, into the opening of the rectifier assembly and radially and axially outward through holes 62. The radially outward flow through the holes 62 is produced at least in part by centrifugal acceleration during rotation. The end 72 from which the electrical connections is made also has an opening 62' from which oil flows. The cross sectional area of the openings 62 and the opening 62' in the end 72, as illustrated in FIG. 4, collectively form an oil dam during rotation of the rotating rectifier assembly which causes the diodes 38 to be fully submerged to provide cooling.

Several modifications of the preferred embodiment described above may be made in the practice of the invention. There is no requirement of having the insulative end plug 72. It is possible to extend the electrical connections 40, 44, 46, 48 and 50 radially outward instead of through the end plug. Furthermore, the electrical connections may be split to extend from both ends, such as having the DC outputs 40 and 44 extending from one end and the AC inputs 46, 48 and 50 extending from the other end, with suitable insulation being provided at both ends to avoid electrical shorting. Furthermore, the diode carriers 18 and 20 may be only structural for supporting the diodes with the electrical conduction for current flow being accomplished with suitable leads or metalization carried on an insulative structure of the diode carriers. The use of insulative diode carriers 18 and 20 eliminates the requirement for the non-conductive sleeve 16. The oil flow circuit may eliminate the flow of oil radially outward through holes 62 with only axial oil flow through hole 62' being used.

While the invention has been described in terms of its preferred embodiments, it should be understood that numerous modifications may be made thereto without departing from the spirit and scope of the invention. It is intended that all such modifications fall within the scope of the appended claims.

We claim:
1. A rectifier assembly comprising:
a rotor shaft assembly having an inner non-conductive annulus;
a first conductive diode carrier having an inner annulus and an outer periphery, the inner annulus including first, second, and third diode receiving surfaces disposed at spaced apart locations on the inner annulus of the first conductive diode carrier, the outer periphery engaging the inner annulus of the rotor shaft assembly;
a second conductive diode carrier, electrically isolated from the first conductive diode carrier, having an inner annulus and an outer periphery, the inner annulus including first, second, and third diode receiving surfaces disposed at spaced apart locations on the inner annulus of the second conductive diode carrier, the outer periphery engaging the inner annulus of the rotor shaft assembly;
a first electrical conductor connected to the first conductive diode carrier and extending to one end of the rectifier assembly to provide a first DC output;
a second electrical conductor connected to the second conductive diode carrier and extending to the one end of the rectifier assembly to provide a second DC output;
a first diode group comprising at least two diodes and a third electrical conductor for connection to a first electrical phase extending to the one end of the rectifier assembly and electrically connected to an anode of at least one diode of the first diode group and to a cathode of at least one other diode of the first diode group with a cathode of each diode of the at least one diode of the first diode group being electrically connected to the first diode receiving surface of the first conductive diode carrier and with an anode of each diode of the at least one other diode of the first diode group being electrically connected to the first diode receiving surface of the second conductive diode carrier;

a second diode group comprising at least two diodes and a fourth electrical conductor for connection to a second electrical phase extending to the one end of the rectifier assembly and electrically connected to an anode of at least one diode of the second diode group and to a cathode of at least one other diode of the second diode group with a cathode of each diode of the at least one diode of the second diode group being electrically connected to the second diode receiving surface of the first conductive diode carrier and with an anode of each diode of the at least one other diode being electrically connected to the second diode receiving surface of the second conductive diode carrier; and a third diode group comprising at least two diodes and a fifth electrical conductor for connection to a third electrical phase extending to the one end of the rectifier assembly and electrically connected to an anode of at least one diode of the third diode group and to a cathode of at least one other diode of the third diode group with a cathode of each diode of the at least one diode of the third diode group being electrically connected to the third diode receiving surface of the first conductive diode carrier and with an anode of each diode of the at least one other diode of the third diode group being electrically connected to the second diode receiving surface of the second conductive diode carrier.

2. A rectifier assembly comprising:

a rotor shaft assembly having an inner non-conductive annulus;

a first conductive diode carrier having an inner annulus including first, second, and third diode receiving surfaces disposed at spaced apart locations on the inner annulus of the first conductive diode carrier and an outer periphery which engages the inner annulus of the rotor shaft assembly;

a second conductive diode carrier, electrically isolated from the first conductive diode carrier, having an inner annulus including first, second, and third diode receiving surfaces disposed at space apart locations on the inner annulus of the second conductive diode carrier and an outer periphery which engages the inner annulus of the rotor shaft assembly;

a first electrical conductor connected to the first conductive diode carrier and extending to one end of the rectifier assembly to provide a first DC output:

a second electrical conductor connected to the second conductive diode; carrier and extending to the one end of the rectifier assembly to provide a second DC output;

a first diode group comprising at least two diodes and a third electrical conductor for connection to a first electrical phase extending to the one end of the rectifier assembly and electrically connected to an anode of at least one diode of the first diode group and to a cathode of at least one other diode of the first diode group with a cathode of each diode of the at least one diode of the first diode group being electrically connected to the first diode receiving surface of the first conductive diode carrier and with an anode of each diode of the at least one other diode of the first diode group being electrically connected to the first diode receiving surface of the second conductive diode carrier;

a second diode group comprising at least two diodes and a fourth electrical conductor for connection to a second electrical phase extending to the one end of the rectifier assembly and electrically connected to an anode of at least one diode of the second diode group and to a cathode of at least one other diode of the second diode group with a cathode of each diode of the at least one diode of the second diode group being electrically connected to the second diode receiving surface of the first conductive diode carrier and with an anode of each diode of the at least one other diode being electrically connected to the second diode receiving surface of the second conductive diode carrier; and a third diode group comprising at least two diodes and a fifth electrical conductor for connection to a third electrical phase extending to the one end of the rectifier assembly and electrically connected to an anode of at least one diode of the third diode group and to a cathode of at least one other diode of the third diode group with a cathode of each diode of the at least one diode of the third diode group being electrically connected to the third diode receiving surface of the first conductive diode carrier and with an anode of each diode of the at least one other diode of the third diode group being electrically connected to the second diode receiving surface of the second conductive diode carrier;

the outer periphery of each of the first and second conductive diode carriers being comprised of three arcuate sections which engage the inner non-conductive annulus and are spaced apart from each other by by portions of the carrier outer periphery located radially inward of the inner non-conductive annulus, the radially inward portions of the carrier outer periphery not engaging the inner non-conductive annulus, each radially inward portion of the carrier outer periphery facing a different one of the first, second, and third diode receiving surfaces.

3. A rectifier assembly in accordance with claim 2 wherein:

each portion is curved.

4. A rectifier assembly in accordance with claim 3 wherein:

each portion forms an arch which curves radially inward toward an axis of rotation of the rectifier assembly from spaced apart points of engagement with the inner non-conductive annulus.

5. A rectifier assembly in accordance with claim 2 wherein:

the rotor assembly comprises a metallic outer cylindrical sleeve having an annulus to which is attached the inner non-conductive annulus and having a central aperture which provides for submersion in cooling oil of a rectifier assembly in accordance with claim, and having a channel in the outer surface for an O-ring to form a fluid seal and at lease one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along inside cross section of the rotor shaft assembly to submerge the diodes during rotation.

6. A rectifier assembly in accordance with claim 4 further comprising:

an insulative end plug disposed in the one end of the rectifier assembly having a plurality of apertures receiving and electrically isolating the first, second, third, fourth and fifth electrical conductors from each other.

7. A rectifier assembly in accordance with claim 2 further comprising:

an insulative end plug disposed in the one end of the rectifier assembly having a plurality of apertures receiving and electrically isolating the first, second, third, fourth and fifth electrical conductors from each other.

8. A rectifier assembly in accordance with claim 3 further comprising:

an insulative end plug disposed in the one end of the rectifier assembly having a plurality of apertures receiving and electrically isolating the first, second, third, fourth and fifth electrical conductors from each other.

9. A rectifier assembly in accordance with claim 4 further comprising:

an insulative end plug disposed in the one end of the rectifier assembly having a plurality of apertures receiving and electrically isolating the first, second, third, fourth and fifth electrical conductors from each other.

10. A rectifier assembly in accordance with claim 2 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

11. A rectifier assembly in accordance with claim 3 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

12. A rectifier assembly in accordance with claim 4 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

13. A rectifier assembly in accordance with claim 5 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

14. A rectifier assembly in accordance with claim 6 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

15. A rectifier assembly in accordance with claim 7 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

16. A rectifier assembly in accordance with claim 8 wherein:

the rotor assembly comprises a metallic outer cylindrical sleeve having an annulus to which is attached the inner non-conductive annulus and at least one hole extending radially from an inside surface to an outside surface of the rotor assembly to provide a path for oil to flow outward from inside the rotor shaft assembly to outside the rotor shaft assembly during rotation of the rectifier assembly; and a source of oil for axially flow along an inside cross section of the rotor shaft assembly to submerge the diodes during rotation.

17. A rectifier assembly in accordance with claim 2 wherein:

the first and second conductors extend axially along the rectifier assembly and radially inward from a point of electrical connection respectively to the first and second diode carriers to the one end of the rectifier assembly.

18. A rectifier assembly in accordance with claim 17 wherein:

the third, fourth and fifth electrical conductors extend axially along the rectifier assembly with a termination of the first, second, third, fourth and fifth conductors being at a radius less than a closest radial position of the diodes relative to an axis of rotation of the rectifier assembly.

19. A rectifier assembly in accordance with claim 18 further comprising:

first, second, third, fourth and fifth terminal connectors connected electrically respectively to an end of each of the first, second, third, fourth and fifth electrical conductors to provide respectively a point of electrical connection to the first and second DC outputs and to the first, second and third electrical phases.

20. A rectifier assembly comprising:

a rotor shaft assembly having an annulus;

a first diode carrier having an inner annulus and an outer periphery, the inner annulus including first, second and third diode receiving surfaces disposed at spaced apart locations on the inner annulus of the first diode carrier, the outer periphery engaging the inner annulus of the rotor shaft assembly;

a second diode carrier, having an inner annulus and an outer periphery, the inner annulus including first, second and third diode receiving surfaces disposed at spaced apart locations on the inner annulus of the second diode carrier, the outer periphery engaging the inner annulus of the rotor shaft assembly;

a first electrical conductor connected to the first diode carrier to provide a first DC output;

a second electrical conductor connected to the second diode carrier to provide a second DC output;

a first diode group comprising at least two diodes and a third electrical conductor for connection to a first electrical phase and electrically connected to an anode of at least one diode of the first diode group and to a cathode of at least one other diode of the first diode group with a cathode of each diode of the at least one diode of the first diode group being connected to the first diode receiving surface of the first diode carrier and with an anode of each diode of the at least one other diode of the first diode group being connected to the first diode receiving surface of the second diode carrier;

a second diode group comprising at least two diodes and a fourth electrical conductor for connection to a second electrical phase and electrically connected to an anode of at least one diode of the second diode group and to a cathode of at least one other diode of the second diode group with a cathode of each diode of the at least one diode of the second diode group being connected to the second diode receiving surface of the first diode carrier and with an anode of each diode of the at least one other diode being connected to the second diode receiving surface of the second conductive diode carrier; and a third diode group comprising at least two diodes and a fifth electrical conductor for connection to a third electrical phase and electrically connected to an anode of at least one diode of the third diode group and to a cathode of at least one other diode of the third diode group with a cathode of each diode of the at least one diode of the third diode group being connected to the third diode receiving surface of the first diode carrier and with an anode of each diode of the at least one other diode of the third diode group being connected to the second diode receiving surface of the second conductive diode carrier.

21. A rectifier assembly in accordance with claim 20 wherein:

the annulus of the rotor assembly is non-conductive, the first and second diode carriers are conductive and electrically isolated from each other and the connections of the diodes to the first, second and third diode receiving surfaces are electrical connections.

22. A rectifier assembly comprising:

a rotor shaft assembly having an annulus;

a first diode carrier having an inner annulus and an outer periphery, the inner annulus including at least one diode receiving surface disposed on the inner annulus of the first diode carrier the outer periphery engaging the inner annulus of the rotor shaft assembly;

a second diode carrier, having an inner annulus and an outer periphery, the inner annulus including at least one diode receiving surface disposed on the inner annulus of the second diode carrier, the outer periphery engaging the inner annulus of the rotor shaft assembly;

a first electrical conductor connected to the first diode carrier to provide a first DC output;

a second electrical conductor connected to the second diode carrier to provide a second DC output;

a diode group comprising at least two diodes and a third electrical conductor for connection to an electrical phase and electrically connected to an anode of at least one diode of the diode group and to a cathode of at least one other diode of the diode group with a cathode of each diode of the at least one diode of the diode group being connected to at least one receiving surface of the first diode carrier and with an anode of each diode of the at least one other diode of the diode group being connected to at least one diode receiving surface of the second diode carrier.

23. A rectifier assembly in accordance with claim 22 wherein:

the annulus of the rotor assembly is non-conductive, the first and second diode carriers are conductive and electrically isolated from each other and the connections of the diodes to the at least one diode receiving surface is an electrical connection.

* * * * *